United States Patent Office 3,824,271
Patented July 16, 1974

3,824,271
3-ALKYL-3-(BENZOYL)PROPIONITRILES
George Rodger Allen, Jr., Old Tappan, N.J., and Francis Joseph McEvoy, Pearl River, N.Y., assignors to American Cyanamid Company, Stamford, Conn.
No Drawing. Filed July 20, 1972, Ser. No. 273,585
Int. Cl. C07c 121/76
U.S. Cl. 260—465 D      4 Claims

ABSTRACT OF THE DISCLOSURE

This disclosure describes compounds of the class of 3-alkyl-3-(substituted-benzoyl)propionitriles useful as intermediates for the preparation of certain long-acting hypotensive agents of the 6-(substituted-phenyl)-5-alkyl-4,5-dihydro-3(2H)-pyridazinone class.

BRIEF SUMMARY OF THE INVENTION

This invention relates to new organic compounds and, more particularly, is concerned with novel 3-alkyl-3-(substituted-benzoyl)propionitriles which may be represented by the following structural formula:

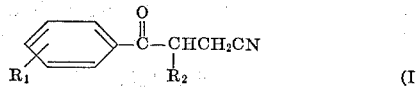

wherein $R_1$ is halogen, nitro, or lower alkanoylamino, and $R_2$ is methyl, ethyl or n-propyl. Suitable lower alkanoylamino groups contemplated by the present invention are those having up to four carbon atoms such as formylamino, acetylamino, propionylamino, n-butyrylamino, and isobutyrylamino. Halogen is exemplified by fluoro, chloro, bromo, and iodo.

DETAILED DESCRIPTION OF THE INVENTION

The novel compounds of the present invention are generally obtainable as white crystalline materials having charactertistic melting points and absorption spectra and which may be purified by recrystallization from organic solvents such as chloroform, ethyl acetate, tetrahydrofuran, dimethylformamide and dimethylsulfoxide.

The novel compounds of the present invention may be readily prepared from a substituted-phenyl alkyl ketone (II) in accordance with the following reaction scheme:

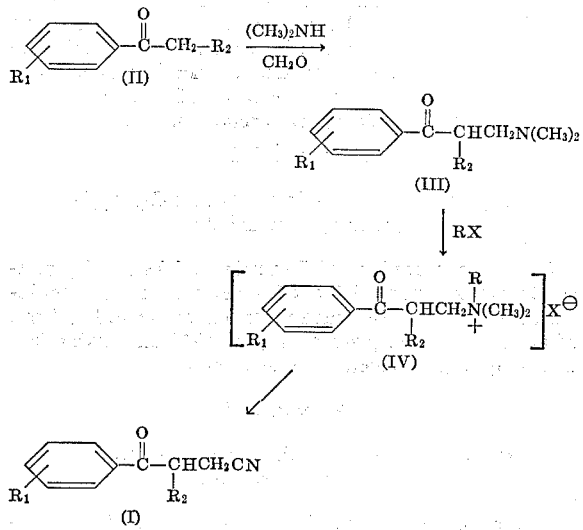

wherein $R_1$ and $R_2$ are as hereinabove defined, R is lower alkyl, and $X^\ominus$ is chloride, bromide, iodide, sulfate, or lower alkyl sulfate. In accordance with the above reaction scheme, treatment of a (substituted)phenyl alkyl ketone (II) with formaldehyde and dimethylamine gives the Mannich base (III). This reaction is carried out at steam bath temperature over a period of time ranging from two to sixteen hours. Treatment of the Mannich base (III) with a lower alkyl halide or a lower alkyl sulfate in an inert solvent gives the quaternary salt (IV). Methyl chloride, methyl bromide, methyl iodide, ethyl iodide, and n-propyl iodide are representative lower alkyl halides suitable for this transformation. Suitable alkyl sulfate for the conversion of the Mannich bases into the quaternary salts are ethyl sulfate, methyl sulfate, and propyl sulfate. When the alkyl sulfates are used for the preparation of the quaternary salts, the composition of the salt is determined by the molar proportions of the reactants. Equimolar amounts of the Mannich base and the alkyl sulfate is productive of the alkyl sulfate salt. For example, reaction of 3 - dimethylamino-2-methyl-4'-bromopropiophenone with an equimolar amount of methyl sulfate is productive of trimethyl (2-p-bromobenzoylpropyl)ammonium methosulfate. Alternatively, the Mannich base may be treated with one-half molar equivalent of the alkyl sulfate; in these circumstances the sulfate of Mannich base results. The preparation of the quaternary salts is best accomplished in an inert, non-protic medium. Suitable solvents are diethyl ether, acetone, dioxane, tetrahydrofuran and the like. Temperatures useful for the reaction range from 0° C. to the boiling point of the solvent.

Treatment of the quaternary salt (IV) with an alkali or alkaline earth metal cyanide produces the new compounds (I) of the present invention. This process for the preparation of the 3-benzoylpropionitriles (I) is best conducted at room temperature for periods of time between ranging from three to twenty four hours. The use of elevated temperatures is detrimental to the yield of product. Water, methanol, ethanol and isopropyl alcohol are particularly advantageous as solvents for the conversion of the quaternary salts (IV) into the new compounds (I).

This process for the preparation of 3-benzoylpropionitriles is unique in that for the first time Mannich bases derived from propionphenones can be converted into 3-(substituted-benzoyl)butyronitriles. Previous efforts [E. B. Knitt, J. Chem. Soc. 1190 (1947)] to convert 3-dimethylamino - 2 - methylpropiophenone hydrochloride into 3-benzoylbutyronitrile failed.

The new 3-(substituted-benzoyl)alkylnitriles (I) of the present invention are useful as intermediates for the preparation of certain long-acting antihypertensive of the dihydropyridazinone class. The preparation of these useful agents from the 3-(substituted-benzoyl)alkylnitriles (I) may be accomplished as set forth in the following reaction scheme:

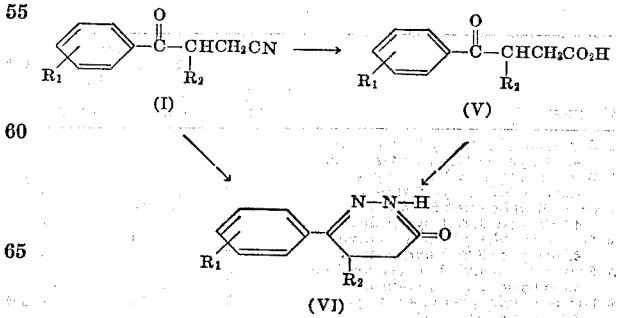

wherein $R_1$ and $R_2$ are as hereinabove defined.

In accordance with this reaction scheme, the 3-benzoylalkylnitriles (I) of the present invention are transformed into the 3-benzoyl-alkylcarboxylic acids (V) by acid or basic hydrolysis. The products (V) are transformed into the useful antihypertensive dihydropyridazinones (VI) by treatment with hydrazine hydrate in a lower alkanol solvent at the reflux temperature for about an hour.

Alternatively, the 3 - (substituted-benzoyl)alkylnitriles (I) of the present invention may be converted directly into the useful antihypertensive dihydroxypyridazinones (VI) by treatment with hydrazine hydrate in the presence of a catalytic amount of a mineral acid such as sulfuric, hydrochloric, hydrobromic, phosphoric, etc. This reaction is best carried out in a lower alkanol solvent at the reflux temperature for a period of time of 3–24 hours. Moreover, those antihypertensives of formula (VI) wherein $R_1$ is cyano can be prepared from the 3-benzoylalkylnitriles of formula (I) in which $R_1$ is halogen by treatment of the intermedaite dihydropyridazinone (VI) ($R_1$=halogen) with cuprous cyanide at the reflux temperature of a solvent such as dimethylformamide, dimethylacetamide, N-methylpyrrolidine, N-methylpiperidone, and the like, for a period of time of 3–24 hours.

The long lasting hypotensive activity of the hydropyridazinones (VI) was demonstrated in the following test procedure. Conscious male albino Sherman strain rats averaging approximately 250 grams in weight were fastened to rat boards in a supine position by means of canvas vests and limb ties. The femoral areas were anesthetized (subcutaneous infiltration of lidocaine), and the left or right common iliac arteries were exposed and clamped off proximally by an artery clamp and distally with thread. Incisions were made near the tie and short nylon catheters were inserted and tied in place. The other end of the catheters were fitted with 24 gauge hubless needles attached to thick-walled polyethylene tubes. The test compounds were administered to the animals orally by gavage (stomach tube). The test compounds were ordinarily suspended or dissolved in 2 percent aqueous starch solution, one milliliter of which gave, per 100 grams of body weight, the desired dose. Mean arterial blood pressure was measured 4 and 24 hours after administration of the compounds. Comparisons were then made to the mean control pressure of 122 mm. of mercury which is the average of a number of controls recorded over months of testing. Blood pressure measurements were made with four Statham P23 Db strain gauges (Statham Instruments, Inc., Los Angeles, Calif.), attached to a Sanborn Polyviso Recorder equipped with four strain gauge preamplifiers with averaging circuits for measuring mean arterial pressure. Table I below summarizes the activity of typical dihydropyridazinones (VI) and compares them with two previously disclosed compounds. It is obvious from an examination of Table I that the dihydropyridazinones (VI) (Nos. 1–5) possess hypotensive activity which is considerably longer lasting than that of the previously disclosed compounds, (Nos. 6 and 7).

TABLE I

| Compound [1] | Number of rats | Median arteria blood pressure (mm. of Hg) | |
|---|---|---|---|
| | | 4 hours | 24 hours |
| 1. 6-(p-acetamidophenyl)-5-methyl-4,5-dihydro-3(2H)-pyridazinone. | 3 | 73 | 89 |
| 2. 6-(m-bromophenyl)-5-methyl-4,5-dihydro-3(2H)-pyridazinone. | 2 | 87 | |
| | 1 | | 85 |
| 3. 6-(m-nitrophenyl)-1,5-dimethyl-4,5-dihydro-3(2H)-pyridazinone. | 2 | 66 | |
| | 1 | | 98 |
| 4. 6-(m-cyanophenyl)-1,5-dimethyl-4,5-dihydro-3(2H)-pyridazinone. | 2 | 64 | |
| | 1 | | 96 |
| 5. 6-(p-cyanophenyl)-1-ethyl-5-methyl-4,5-dihydro-3(2H)-pyridazinone. | 2 | 74 | |
| | 1 | | 79 |
| 6. 6-(p-acetamidophenyl)4-5-dihydro-3(2H)-pyridazinone [2]. | 3 | 77 | 119 |
| 7. 6-(p-aminophenyl)-4,5-dihydro-3(2H)-pyridazinone [2]. | 3 | 79 | 110 |
| 8. Controls | 25 | 123 | 122 |

[1] All compounds dosed at 100 mg./kg. of body weight.
[2] Disclosed in U.S. Patent No. 3,475,431.

The invention will be described in greater detail in conjunction with the following specific examples.

EXAMPLE 1

Preparation of 4'-(3-dimethylamino-2-methylpropionyl)acetanilide

A solution of 21 g. (0.257 mol) of dimethylamine hydrochloride in 15.2 ml. (0.203 mol) of 37% aqueous formaldehyde is allowed to stand at room temperature for 30 minutes. To the solution is added 105 ml. (1.1 mol) of acetic anhydride and the mixture is swirled until a clear solution results and spontaneous gentle boiling begins. To the still warm solution is added 32.8 g. (0.172 mol) of p-acetamidopropiophenone and the mixture is heated on the steam-bath for 2 hours. The reaction mixture is evaporated on a waterbath at 55°–60° C. To the residue is added 350 ml. of acetone and the solution is boiled for 5 minutes, then evaporated. The residual gum is dissolved in 350 ml. of water and washed with three 250 ml. portions of methylene chloride. The aqueous solution is stirred in an ice-bath with 250 ml. of methylene chloride and rendered alkaline by the dropwise addition of 2.5N sodium hydroxide solution. The methylene chloride solution is separated and the aqueous solution is extracted with an additional 250 ml. of methylene chloride. The combined organic extract is washed with saline, dried and evaporated leaving 40 g. of 4'-(3-dimethylamino-2-methylpropionyl)acetanilide as an oil.

EXAMPLE 2

Preparation of 4'-(3-dimethylamino-2-ethylpropionyl)acetanilide

A solution of 2.1 g. of dimethylamine hydrochloride in 1.52 ml. of 37% aqueous formaldehyde is allowed to stand at room temperature for 30 minutes. To the solution is added 10.5 ml. of acetic anhydride and the mixture is swirled until a clear solution results and spontaneous gentle boiling begins. To the still warm solution is added 3.28 g. of p-acetamidobutyrophenone and the mixture is heated on the steam-bath for 2 hours. The reaction mixture is evaporated on a waterbath at 55°–60° C. To the residue is added 35 ml. of acetone and the solution is boiled for 5 minutes, then evaporated. The residual gum is dissolved in water and washed with three portions of methylene chloride. The aqueous solution is stirred in an ice-bath with methylene chloride and rendered alkaline by the dropwise addition of 2.5N sodium hydroxide solution. The methylene chloride solution is separated and the aqueous solution is extracted with additional methylene chloride. The combined organic extract is washed with saline, dried and evaporated leaving 4.39 g. of 4'-(3-dimethylamino-2-ethylpropionyl)acetanilide as an oil.

EXAMPLE 3

Preparation of 4'-(3-dimethylamino-2-propylpropionyl)acetanilide

Using the procedure of Example 1, 3.78 g. of p-acetamidovalerophenone, 2.1 g. of dimethylamine hydrochloride, 1.52 ml. of 37% aqueous formaldehyde and 10.5 ml. of acetic anhydride gives 4.44 g. of 4'-(3-dimethylamino-2-propylpropionyl)acetanilide as a gum.

EXAMPLE 4

Preparation of 3-dimethylamino-2-methyl-3'-nitropropiophenone

In the manner described in Example 1, 29.5 g. of m-nitropropiophenone, 20.3 g. of dimethylamine hydrochloride, 14.8 ml. of 37% aqueous formaldehyde and 100 ml. of acetic anhydride give 34 g. of 3-dimethylamino-2-methyl-3'-nitropropiophenone as a gum.

EXAMPLE 5

Preparation of 3-dimethylamino-2-(methyl-4'-bromopropiophenone

Using the procedure of Example 1, 18.4 g. of dimethylamino hydrochloride and 15.7 ml. of 37% aqueous formaldehyde are treated with 90 ml. of acetic anhydride. The clear solution that results following reaction is treated with 34.6 g. of p-bromopropiophenone at 90–95° C. for two hours; there results 30.0 g. of product, which is obtained as an oil.

EXAMPLE 6

Preparation of 3-dimethylamino-2-methyl-2'-nitropropiophenone

Using the procedure of Example 1, the solution resulting from treatment of a mixture of 4.20 g. of dimethylamino hydrochloride and 3.1 ml. of 37% aqueous formaldehyde with 21 ml. of acetic anhydride is heated with 6.55 g. of 2'-nitropropiophenone for 2 hours. The product is obtained as a yellow liquid (5.98 g.), the hydrochloride salt of which is prepared by treatment of the base with ethanolic hydrogen chloride. The white crystals of the hydrochloride are recrystallized from ethanol to give a solid, m.p. 159–160° C.

EXAMPLE 7

Preparation of 3-dimethylamino-2-methyl-4'-chloropropiophenone

Using the procedure of Example 1, 16.8 g. of p-chloropropiophenone, 11.7 g. of dimethylamine hydrochloride 10 ml. of formalin and 57 ml. of acetic anhydride give 21.28 g. of product as a colorless liquid.

EXAMPLE 8

Preparation of 3-dimethylamino-2-methyl-4'-fluoropropiophenone

Using the procedure of Example 1, 15.2 g. of p-fluoropropiophenone, 11.7 g. of dimethylamino hydrochloride, 10 ml. of formalin and 57 ml. of acetic anhydride give 20.89 g. of porduct as a colorless liquid.

EXAMPLE 9

Preparation of [2-(p-acetamidobenzoyl)propyl] trimethylammonium

A solution of 40 g. (0.16 mol) of 4'-(3'-dimethylamino-2-methylpropionyl)acetanilide and 22 ml. (0.33 mol) of iodomethane in 400 ml. of acetone is stirred at reflux temperatnre for 18 hours. The mixture is cooled and 51.9 g. of methiodide, m.p. 206–207° C., is collected by filtration.

EXAMPLE 10

Preparation of [2-(p-acetamidobenzoyl)butyl] trimethylammonium iodide

A solution of 34.5 g. of 4'-(3-dimethylamino-2-ethylpropionyl)acetanilide and 17 ml. of iodomethane in 320 ml. of acetone is stirred at room temperature for one hour. The mixture is cooled to give 42.3 g. of methiodide as an acetone solvate, m.p. 78° C. dec.

EXAMPLE 11

Preparation of [2-(p-acetamidobenzoyl)valeryl] trimethylammonium iodide

In the manner described in Example 4, from 4.44 g. of 4'-(3-dimethylamino-2-propylpropionyl)acetanilide and 2.1 ml. of iodomethane is obtained 4.65 g. of methiodide as an acetone solvate, m.p. 100° C.

EXAMPLE 12

Preparation of trimethyl(2-m-nitrobenzoylpropyl) ammonium iodide

Using the procedure of Example 4, 34 g. of 3-dimethylamino-2-methyl-3'-nitropropiophenone and 18 ml. of iodomethane give 49.6 g. of quaternary salt as yellow crystals, m.p. 206–208° C.

EXAMPLE 13

Preparation of trimethyl(2-p-bromobenzoylpropyl) ammonium iodide

Using the procedure of Example 9, 7.14 g. of 3-dimethylamino-2-methyl-4'-bromopropiophenone and 4 ml. of methyl iodide react in 70 ml. of acetone to give 10.20 g. of white crystals, m.p. 184–185° C.

EXAMPLE 14

Preparation of trimethyl(2-o-nitrobenzoylpropyl) ammonium iodide

Using the procedure of Example 9, 5.98 g. of 3-dimethylamino-2-methyl-2'-nitropropiophenone and 3.1 ml. of methyl iodide react in 25 ml. of acetone to give 8.28 g. of yellow crystals, m.p. 169–170° C. with resolidification and final m.p. 185–190° C.

EXAMPLE 15

Preparation of trimethyl(2-p-chlorobenzoylpropyl) ammonium iodide

Using the procedure of Example 9, 21.28 g. of 3-dimethylamino-2-methyl-4'-chloropropiophenone and 15 ml. of methyl iodide in 250 ml. of acetone to give 30.26 g. of product as white crystals, m.p. 179–180° C.

EXAMPLE 16

Preparation of trimethyl(2-p-fluorobenzoylpropyl) ammonium iodide

Following the procedure of Example 9, treatment of 20.89 g. of 3-dimethylamino-2-methyl-4'-fluoropropiophenone with 15 ml. of methyl iodide in 150 ml. of acetone gives 20.89 g. of product as white crystals, m.p. 186–187° C.

EXAMPLE 17

Preparation of 4'-(3-cyano-2-methylpropionyl)acetanilide

To a stirred solution of 390 mg. (0.006 mol) of potassium cyanide in 20 ml. water is added 975 mg. (0.0025 mol) of [2-(p-acetamidobenzoyl)propyl] trimethylammonium iodide. An oil separates which gradually turns to a white solid during 4 hours of stirring. The solid is collected and washed liberally with water affording 500 mg. of nitrile, m.p. 122–127° C. A similar preparation crystallized from acetone-petroleum ether has m.p. 131–132° C.

EXAMPLE 18

Preparation of 4'-(3-cyano-2-ethylpropionyl)acetanilide

To a stirred solution of 13.6 g. of potassium cyanide in 500 ml. of water is added 42.4 g. of [2-(p-acetamidobenzoyl)butyl]trimethylammonium iodide. An oil separates which gradually turns to a white solid during 4 hours of stirring. The solid is collected and washed liberally with water affording 17.5 g. of nitrile, m.p. 117–124° C. A similar preparation crystallized from acetone-petroleum ether has m.p. 129–130° C.

EXAMPLE 19

Preparation of 4'-(3-cyano-2-propylpropionyl) acetanilide

Using the procedure of Example 7, 4.5 g. of [2-p-acetamidobenzoyl)-valeryl]trimethylammonium iodide and 3.9 g. of potassium cyanide give 1.9 g. of nitrile.

A sample recrystallized from acetone-petroleum ether has melting point 103–105° C.

EXAMPLE 20

Preparation of 3-*m*-nitrobenzoylbutyronitrile

A mixture of 49.6 g. of trimethyl(2-*m*-nitrobenzoylpropyl)ammonium iodide and 20.8 g. of potassium cyanide in 800 ml. of water is stirred for 18 hours. The white solid is collected and washed liberally with water to afford 26.2 g. of nitrile, m.p. 60–62° C. A similar preparation recrystallized from diethyl ether melted at 63–64° C.

EXAMPLE 21

Preparation of 3-(*p*-bromobenzoyl)butyronitrile

A solution of 33.39 g. of trimethyl(2-*p*-bromobenzoylpropyl)ammonium iodide and 12.60 g. of potassium cyanide in 500 ml. of methanol is stirred at room temperature for 3 hours. The methanol is removed under reduced pressure, and the residue is distributed between methylene chloride and water. The organic solution is dried over magnesium sulfate and evaporated to give 20.92 g. of product as a colorless oil.

EXAMPLE 22

Preparation of 3-(*o*-nitrobenzoyl)butyronitrile

Using the procedure of Example 21, a solution of 18.65 g. of trimethyl(2-*o*-nitrobenzoylpropyl)ammonium iodide and 7.65 g. of potassium cyanide in 500 ml. of methanol gives 9.43 g. of product as a pale yellow oil.

EXAMPLE 23

Preparation of 3-(p-chlorobenzoyl)butyronitrile

Using the procedure of Example 21, a solution of 7.36 g. of trimethyl(2 - *p* - chlorobenzoylpropyl)ammonium iodide and 3.12 g. of potassium cyanide in 150 ml. of methanol yields 4.27 g. of product as a colorless liquid the ir of which has absorption bands *inter alia* at 4.42, 5.92 and 6.30μ.

EXAMPLE 24

Preparation of 3-(*p*-fluorobenzoyl)butyronitrile

Using the procedure of Example 21, a solution of 14.04 g. of trimethyl(2-p-fluorobenzoylpropyl)ammonium iodide and 6.24 g. of potassium cyanide in 300 ml. of methyl alcohol gives 7.63 g. of product as a colorless liquid in ir of which has absorption bands *inter alia* at 4.42, 5.92, 6.26μ.

EXAMPLE 25

Preparation of 3-(*p*-aminobenzoyl)butyric acid

A solution of 23.2 g. (0.1 mol) of 4′-(3-cyano-2-methylpropionyl)acetanilide and 230 ml. of 6N hydrochloric acid is stirred at reflux temperature for one hour. The solution is evaporated and the residue is triturated with acetone affording in, two crops, 28 g. of amino acid hydrochloride mixed with ammonium chloride. A 1.22 g. sample of this material is dissolved in 12 ml. of water and the solution is brought to pH 4 by the dropwise addition of 1.0N sodium hydroxide solution. The ice-cooled solution deposits 690 mg. of white crystals, m.p. 119–123° C. Recrystallization of this material from acetone-benzene raises the m.p. to 121–123° C.

EXAMPLE 26

Preparation of 3-(*p*-aminobenzoyl)valeric acid

A mixture of 1.0 g. of 4′-(3-cyano-2-ethylpropionyl)-acetanilide and 10 ml. of 6N hydrochloric acid is stirred at reflux temperature for one hour. The solution is evaporated and the residue is triturated with acetone affording the amino acid hydrochloride mixed with ammonium chloride. This material is dissolved in water and the solution is brought to pH 4 by the dropwise addition of 1.0N sodium hydroxide solution. The ice-cooled solution deposits 360 mg. of white crystals, m.p. 129–131° C. Recrystallization of this material from acetone-petroleum ether (b.p. 30–60° C.) raises the m.p. to 128–129° C.

EXAMPLE 27

Preparation of 3-(*p*-aminobenzoyl)hexanoic acid

Using the procedure of Example 10, the hydrolysis of 1.36 g. of 4′-(3-cyano-2-propylpropionyl)acetanilide affords 880 mg. of amino acid, m.p. 110–111° C.

EXAMPLE 28

Preparation of *m*-nitrobenzoylbutyric acid

A mixture of 26.2 g. of 3-*m*-nitrobenzoylbutyronitrile and 800 ml. of 6N hydrochloric acid is vigorously stirred and heated under reflux for 75 minutes. The mixture is cooled and extracted with methylene chloride. The methylene chloride extract is washed with saline solution and extracted with 250 ml. and 150 ml. portions of 2.5N sodium hydroxide solution. The alkaline solution is stirred in an ice-bath and acidified by the dropwise addition of 6N hydrochloric acid. The precipitate is collected and washed liberally with water to afford 24.9 g. of cream colored crystals, m.p. 84–87° C. A similar preparation crystallized from methylene chloride-petroleum ether melts at 89–90° C.

EXAMPLE 29

Preparation of 3-(*p*-bromobenzoyl)butyric acid

A mixture of 20.92 g. of 3-(*p*-bromobenzoyl)butyronitrile and 600 ml. of 6N hydrochloric acid is heated at reflux temperature with stirring for 2 hours. The cooled mixture is extracted with methylene chloride, and the organic solution is washed with 1N sodium hydroxide solution (100 ml., 50 ml.). The combined alkaline solutions are chilled in an ice-bath and acidified with 3N hydrochloric acid solution. The white crystals that precipitate are collected and dried to give 18.93 g. of product, m.p. 93–96° C.

EXAMPLE 30

Preparation of methyl 3-(*o*-nitrobenzoyl)butyrate

A solution of 9.43 g. of 3-(*o*-nitrobenzoyl)butyronitrile in 200 ml. of methanol containing hydrogen chloride is heated at reflux temperature for 3 hours. The solvent is removed, and the residue is distributed between methylene chloride and water. The organic layer is dried and evaporated to give 7.32 g. of product as a yellow liquid, the IR spectrum of which is characterized by C=O stretching frequencies at 5.75 and 5.88μ.

EXAMPLE 31

Preparation of 3-(*p*-chlorobenzoyl)butyric acid

Using the procedure of Example 29 a mixture of 4.27 g. of 3-(*p*-chlorobenzoyl)butyronitrile and 120 ml. of 6N hydrochloric acid gives 3.65 g. of product as white crystals, m.p. 82–84° C.

EXAMPLE 32

Preparation of 3-(*p*-fluorobenzoyl)butyric acid

Using the procedure of Example 29 a mixture of 3-(*p*-fluorobenzoyl)butyronitrile and 6N hydrochloric acid gives the product as a liquid.

EXAMPLE 33

Preparation of 6-(*p*-aminophenyl)-4,5-dihydro-5-methyl-3(2H)-pyridazinone

A solution of 6.65 g. of 3-(*p*-aminobenzoyl)butyric acid and 3.5 ml. of hydrazine hydrate in 38 ml. of ethyl alcohol is heated at reflux temperature for two hours. The solution is chilled in an ice-bath and filtered to give 5.68 g. of product as white crystals, m.p. 201–203° C.

EXAMPLE 34

Preparation of 6-(p-anilino)-5-ethyl-4,5-dihydro-3(2H)-pyridazinone

A solution of 1.2 g. of 3-(p-aminobenzoyl)valeric acid and 0.8 ml. of 99% hydrazine hydrate in 8 ml. of ethanol is stirred and heated at reflux temperature for 2 hours. The solution is cooled and 394 mg. of 6-anilino-5-ethyl-4,5-dihydro-3-(2H)-pyridazinone, m.p. 155°–157° C. is collected. Evaporation of the filtrate and trituration of the residue with petroleum ether affords an additional 680 mg. of product, m.p. 150–153° C.

EXAMPLE 35

Preparation of 6-(p-anilino)-5-(n-propyl)-4,5-dihydro-3(2H)pyridazinone

By the procedure of Example 18, treatment of 880 mg. of 3-(p-aminobenzoyl)hexanoic acid with 0.6 ml. of hydrazine hydrate in 6 ml. of ethanol gives 470 mg. of product, m.p. 171°–173° C. A second crop weighing 280 mg. is obtained by evaporation of the filtrate and triturated of the residue with petroleum ether (b.p. 30°–60°).

EXAMPLE 36

Preparation of 4,5-dihydro-5-methyl-6-(m-nitrophenyl)-3(2H)-pyridazinone

A solution of 9.00 g. of 3-(m-nitrobenzoyl)butyric acid and 4.1 ml. of 98–100% hydrazine hydrate is heated at reflux temperature for 90 minutes. A solid begins precipitating after about one hour. The mixture is cooled and filtered to give 7.70 g. of yellow crystals, m.p. 197–198° C.

EXAMPLE 37

Preparation of 6-(m-anilino)-4,5-dihydro-5-methyl-3(2H)-pyridazinone

A mixture of 9.32 g. of 4,5-dihydro-5-methyl-6-(m-nitrophenyl)-3(2H)-pyridazinone and 0.93 g. of 10% palladium-on-charcoal catalyst in 150 ml. of ethanol is shaken under hydrogen in a Parr low pressure hydrogenation apparatus. The reduction is essentially complete in 16 minutes and the mixture is filtered through diatomaceous silica. Evaporation of the filtrate gives an amber oil that rapidly crystallizes with ether. Filtration of the mixture gives 7.35 g. of white crystals, m.p. 143–144° C.

EXAMPLE 38

Preparation of 6-(p-bromophenyl)-4,5-dihydro-5-methyl-3(2H)-pyridazinone

A solution of 34.85 g. of β-(p-bromobenzoyl)butyric acid and 10.0 g. of 98–100% hydrazine hydrate in 300 ml. of ethanol is heated at reflux temperature with stirring for 3 hours. The mixture which results is chilled in an ice-bath and filtered to give 31.57 g. of white crystals, m.p. 197–199° C.

EXAMPLE 39

Preparation of p-(1,4,5,6-tetrahydro-4-methyl-6-oxo-3-pyridazinyl)benzonitrile

A mixture of 20.43 g. of 6-(p-bromophenyl)-4,5-dihydro-5-methyl-3(2H)-pyridazinone and 9.10 g. of cuprous cyanide is stirred at reflux temperature for 4.5 hours. The hot mixture is poured into a solution of 46 ml. of ethylenediamine in 230 ml. of water, and the mixture is stirred at ice-bath temperature for 20 minutes. Filtration gives a solid which after washing with copious amounts of water and air-drying gives 14.20 g. of solid, m.p. 194–197° C.

EXAMPLE 40

Preparation of 6-(m-bromophenyl)-4,5-dihydro-5-methyl-3(2H)-pyridazinone

A solution of 5.22 g. of 4,5-dihydro-5-methyl-6-(m-aminophenyl)-3-(2H)-pyridazinone in 18 ml. of water and 11 ml. of water and 11 ml. of 48% aqueous hydrogen bromide is stirred at 0° C. The hydrobromide salt separates and to the slurry is added in portions 1.79 g. of sodium nitrite, maintaining temperature at 0–3° C. Solution is complete at first and then the diazonium bromide salt precipitates. The thin slurry is added dropwise to a cold solution of 4.05 g. of cuprous bromide in 13 ml. of 48% aqueous hydrogen bromide and 5.5 ml. of water. The mixture is stirred at 0° C. for 30 minutes, allowed to warm to 20° C. and then finally stirred at 40° C. for one hour.

The mixture is cooled and diluted with 90 ml. of water. The resulting precipitate is collected, dried and extracted with two 100 ml. portions of methylene chloride. The extract is evaporated and the residual glass is dissolved in 100 ml. of a 5% solution of acetone in methylene chloride. This solution is slurried with a synthetic magnesium-silica gel adsorbent and filtered thru a pad of the same adsorbent, washing liberally with the same solvent mixture. The filtrate is evaporated and the resultant solid recrystallized from acetone-hexane affording 1.75 g. white crystals, m.p. 160–163° C. Material which is recrystallized two times from acetone-hexane melts at 162–164° C.

EXAMPLE 41

Preparation of m-(1,4,5,6,-tetrahydro-4-methyl-6-oxo-3-pyridazinyl)benzonitrile

Using the procedure of Example 39 a mixture of 1.75 g. of 6-(m-bromophenyl)-4,5-dihydro - 5 - methyl-3(2H)-pyridazinone and 0.78 g. of cuprous bromide in 5.8 ml. of dimethylformamide is heated at reflux temperature to give 1.08 g. of product as crystals, m.p. 184–188° C.

EXAMPLE 42

Preparation of 6-(p-chlorophenyl)-4,5-dihydro-5-methyl-3(2H)-pyridazinone

Using the procedure of Example 38 a solution of 3.39 g. of 3-(p-chlorobenzoyl)butyric acid and 1.2 ml. of hydrazine hydrate in 50 ml. of ethanol gives 2.87 g. of product as white crystals, m.p. 207–208° C.

EXAMPLE 43

Preparation of 6-(p-fluorophenyl)-4,5-dihydro-5-methyl-3(2H)-pyridazinone

Using the procedure of Example 38 a solution of 1.97 g. of 3-(p-fluorobenzoyl)butyric acid and 0.5 ml. of hydrazine hydrate in 25 ml. of ethanol gives 1.32 g. of product as white crystals, m.p. 170–171.5° C.

EXAMPLE 44

Preparation of 6-(p-cyanophenyl)-4,5-dihydro-5-methyl-3(2H)-pyridazinone

Using the procedure of Example 39 2.22 g. of 6-(p-chlorophenyl)-4,5-dihydro-5-methyl-3(2H) - pyridazinone and 1.50 g. of cuprous cyanide give the product as nearly white crystals, m.p. 195–197° C.

EXAMPLE 45

Preparation of 6-(p-acetamidophenyl)-4,5-dihydro-5-methyl-3(2H)-pyridazinone

A mixture of 1.28 g. of 3-(p-acetamidobenzoyl)-butyronitrile and 0.6 ml. of hydrazine hydrate in 10 ml. of ethanol is stirred at reflux temperature for two hours. The solution is chilled in an ice bath and the mixture is filtered to give 0.75 g. of white crystals, m.p. 228–234° C.

What is claimed is:
1. Compounds of the formula:

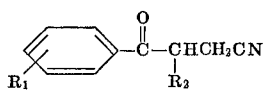

wherein $R_1$ is selected from the group consisting of nitro and acetamido and $R_2$ is selected from the group consisting of methyl, ethyl and n-propyl.

2. A compound according to Claim 1 wherein $R_1$ is p-acetamido and $R_2$ is methyl.

3. A compound according to Claim 1 wherein $R_1$ is m-nitro and $R_2$ is methyl.

4. A compound according to Claim 1 wherein $R_3$ is p-acetamido and $R_2$ is ethyl.

References Cited

Fuson et al.: J. Amer. Chem. Soc., vol. 61, pp. 1940-2 (1939).

LEWIS GOTTS, Primary Examiner

D. H. TORRENCE, Assistant Examiner

U.S. Cl. X.R.

260—250 A, 465 R, 465 G, 515 R, 515 A, 518 R, 570.5 C, 567.6 M; 424—250